United States Patent
Attarwala et al.

(10) Patent No.: US 7,525,981 B2
(45) Date of Patent: Apr. 28, 2009

(54) GLARE RESOLUTION

(75) Inventors: Murtuza Attarwala, Sunnyvale, CA (US); Premal Dinesh Desai, San Jose, CA (US); Neeraj Gulati, Cupertino, CA (US); Mehul Dholakia, Milpitas, CA (US)

(73) Assignee: Ciena Corporation, Linthicum, MD (US)

( * ) Notice: Subject to any disclaimer, the term of this patent is extended or adjusted under 35 U.S.C. 154(b) by 1024 days.

(21) Appl. No.: 10/894,226

(22) Filed: Jul. 19, 2004

(65) Prior Publication Data

US 2008/0130677 A1 Jun. 5, 2008

(51) Int. Cl.
*H04L 12/28* (2006.01)
*H04L 12/43* (2006.01)

(52) U.S. Cl. ............... 370/431; 370/458; 370/462; 370/463

(58) Field of Classification Search .......... None
See application file for complete search history.

(56) References Cited

U.S. PATENT DOCUMENTS

| | | | | |
|---|---|---|---|---|
| 5,444,694 A | * | 8/1995 | Millet et al. | 370/224 |
| 6,856,627 B2 | * | 2/2005 | Saleh et al. | 370/397 |
| 7,286,490 B2 | * | 10/2007 | Saleh et al. | 370/254 |
| 7,372,832 B2 | * | 5/2008 | Bevan et al. | 370/329 |
| 2003/0206516 A1 | * | 11/2003 | Chen et al. | 370/227 |

* cited by examiner

*Primary Examiner*—Wing F Chan
*Assistant Examiner*—Robert C Scheibel
(74) *Attorney, Agent, or Firm*—Merek, Blackmon & Voorhees, LLC

(57) ABSTRACT

An embodiment of the invention provides a method for glare resolution in a network. The method first designates a master node and a slave node. The method prevents the slave node from initially allocating a first line and a first timeslot for a first sub network connection (SNC) (SNC2 or SNCs2. The master node allocates the first line and the first timeslot for the first SNC, and a second line and a second timeslot for a second SNC (SNC1 or SNCs1).

20 Claims, 6 Drawing Sheets

US 7,525,981 B2

GLARE RESOLUTION

TECHNICAL FIELD

Embodiments of the invention relate generally to communication networks, and more particularly to an apparatus and method for performing glare resolution.

BACKGROUND

During the establishment of an optical connection in a network, the source node computes a path through the network and sets up the path by using a signaling protocol and a routing protocol. The optical connection may be, for example, a Sub Network Connection (SNC), which is a collection of one or more SONET (Synchronous Optical Network)) paths or SDH (Synchronous Digital Hierarchy) paths, and a suitable signaling and routing protocol may be, for example, the Optical Signaling & Routing Protocol (OSRP) that is used in a SONET system. The SONET standard is used in the United States and Canada and is a variation of the SDH standard. SDH is the ITU-TSS (International Telecommunications Union-Telecommunications Standards Sector) international standard transmitting information over optical fiber.

More particularly, an SNC is a connection from a node in a separately identifiable part of a larger network to another node in the network, and typically spans multiple nodes and links. As part of an SNC creation, switching paths are created along the nodes that are traverse by SNC, thus enabling data to flow from the originating node to the destination node. In other words, an optical network can be partitioned into a set of optical sub-networks interconnected by optical links, and the SNC is a connection across an optical sub-network.

When two SNCs, each originating in opposite directions, are being established at the same time and are contending for the same resource in the network, the condition known as "glare" may occur. Glare prevents establishment of SNCs between two nodes. Glare occurs because each node on either side of the optical connection are making a decision, independent of the opposite node, as to which line and "timeslot" to use for an SNC. Timeslots are the discrete quanta of bandwidth on a line. In other words, glare occurs because the bandwidth limitation on the line prevents the two SNCs from concurrently being established during the SNC set up phase between the two nodes. As a result of the glare occurrence, both SNCs are not established between the two nodes, even if there is sufficient bandwidth to establish at least one of the SNCs between the two nodes.

Therefore, the current technology is limited in its capabilities and suffers from at least the above constraints and deficiencies.

SUMMARY OF EMBODIMENTS OF THE INVENTION

An embodiment of the invention provides a method for glare resolution in a network. The method first designates a master node and a slave node. The method prevents the slave node from initially allocating a first line and a first timeslot for a first sub network connection (SNC) (SNC2 or SNCs2). The master node allocates the first line and the first timeslot for the first SNC, and a second line and a second timeslot for a second SNC (SNC1 or SNCs2).

An embodiment of the invention further provides a system or apparatus that can perform the method mentioned above.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
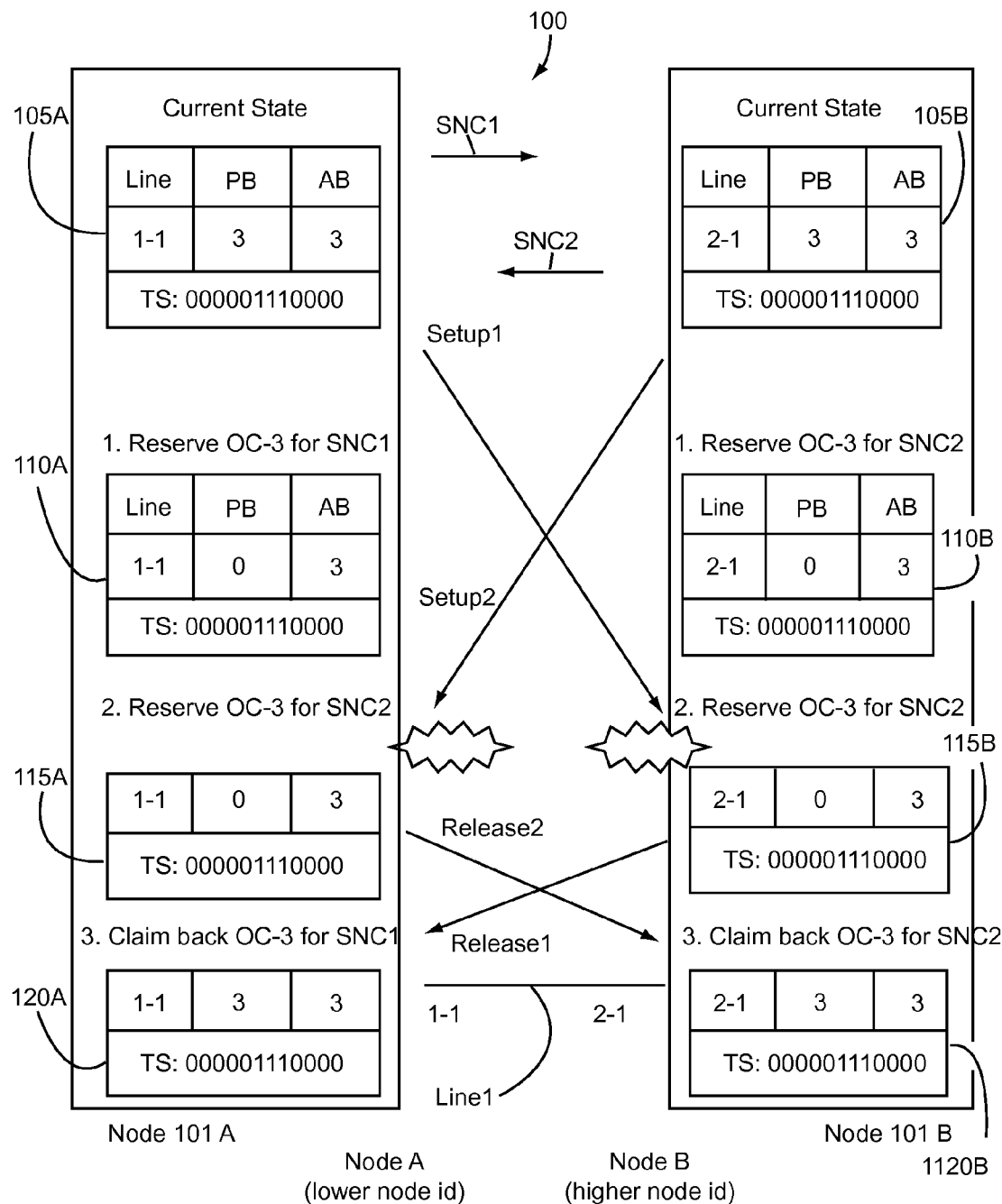
FIG. 1 is a block diagram that illustrates a glare condition of a conventional method.

FIG. 1 is a block diagram that illustrates a glare condition of a conventional method in a conventional apparatus 100, for purposes of describing the drawbacks and disadvantages of previous approaches. The apparatus 100 is typically a portion of a communication network and includes nodes 101A and 101B. Each node (generally referred to as node 101) is a network element and may support various services such as sub-network connections (SNCs). An SNC is a collection of one or more SONET/SDH paths. Each of the nodes 101 may be other suitable network elements. The logical connection between the nodes 101 is commonly known as a link.

In the example of FIG. 1, the following conditions are assumed. First, there is only one link between the nodes 101A and 101B, where the link is, for example, an optical signaling and routing protocol (OSRP) link. Second, the OSRP link contains a single line, where the line is, for example, an OSRP line (i.e., a line transmitting signals based on the OSRP protocol). Third, attempts are made to establish two SNCs between the nodes 101 at the same time. In particular, attempt is made to establish a first SNC (SNC1) from node 101A to node 101B, while attempt is made to establish a second SNC (SNC2) from node 101B to node 101A during the SNC setup phase. The SNC setup phase in the OSRP protocol is known to those skilled in the art. Fourth, the link between nodes 101A and 101B has an available bandwidth (AB) that can accommodate only one of the SNCs, and this limitation can lead to the glare condition as described in detail below.

For further background information, some of the routing and signal functions of OSRP are disclosed in commonly owned and co-pending U.S. patent application Ser. No. 09/259,263, filed Mar. 1, 1999, entitled "ROUTING AND SIGNALING IN A SONET NETWORK", now U.S. Pat. No. 7,009,934, which is hereby fully incorporated herein by reference, and in commonly owned and co-pending U.S. patent application Ser. No. 09/493,344, filed Jan. 28, 2000, entitled "SYSTEM AND METHOD FOR CALCULATING PROTECTION ROUTES IN A NETWORK PRIOR TO FAILURE", now U.S. Pat. No. 6,859,431, which is hereby fully incorporated herein by reference. The routing protocol in OSRP is responsible for various functions such as discovery of neighbors and link status, reliable distribution of routing topology information, and optimal route determination. The signaling protocol provides various capabilities such as the capability of establishing, tearing down, and modifying connections across a network of nodes (network elements).

In FIG. 1, assume that a line (labeled as Line1) is between nodes 101A and 101B. Line1 is formed by connecting a line 1-1 (which originates from node 101A) to a line 2-1 (which originates from node 101B). The state information for the line 1-1 and line 2-1 are stored in respective databases (not shown in FIG. 1) in each of the nodes 101.

As shown in initial state (or initial state information) 105A, line 1-1 has initially a provisional bandwidth (PB) of 3 (i.e., OC-3) and an available bandwidth (AB) of 3, and an example timeslot (TS) of 000001110000. As shown in initial state 105B, line 2-1 has initially a provisional bandwidth (PB) of 3 and an available bandwidth (AB) of 3, and an example timeslot (TS) of 000001110000. As known to those skilled in the art, the Synchronous Optical Network (SONET) includes a set of signal rate multiples for transmitting digital signals on an optical fiber. The base rate (OC-1 or Optical Carrier level 1) is 51.84 Mbps data rate. OC-3 is a multiple of the base rate and is equal to 155.52 Mbps data rate.

During the SNC setup phase in the OSRP protocol, assume that an SNC setup message (SETUP1), for setting up SNC1, reaches node 101A at the same time as an SNC setup message (SETUP2), for setting up SNC2, reaches node 101B. The SNC setup messages are known to those skilled in the art. Note that the SNC setup messages (SETUP1 and SETUP2) are then forwarded to the opposite nodes, as shown in FIG. 1. In other words, SETUP1 is forwarded to the opposite node 101B and SETUP2 is forwarded to the opposite node 101A. The provisional bandwidth (PB) for line 1-1 will be reserved for SNC1 on node 101A, and the provisional bandwidth for line 2-1 will be reserved for SNC2 on node 101B. Therefore, as shown in subsequent state 110A, node 101A reserves the bandwidth of OC-3 for SNC1 on line 1-1, so that the provisional bandwidth for line 1-1 is now 0 (i.e., OC−x=0). As shown in state 110B, node 101B reserves the bandwidth of OC-3 for SNC2 on line 2-1 so that the provisional bandwidth for line 2-1 is now 0.

When the SETUP1 message for SNC1 reaches node 101B from node 101A, there will be no available bandwidth (AB) for SNC1 on line 2-1 because node 101B has reserved a provisional bandwidth of 3 (OC-3) on line 2-1 for SNC2 (i.e., PB=0 on line 2-1), as indicated in state 115B. As a result the SNC1 is "released" when the RELEASE1 message is transmitted from node 101B to node 101A, and SNC1 is not established between nodes 101A and 101B. As known to those skilled in the art, releasing an SNC results in all switching paths to be torn down along all the nodes and links that are traversed by the SNC. In state 120A, the node 101A will claim back (have available) the bandwidth of 3 (OC-3) for SNC1 for the provisional bandwidth on line 1-1, so that a provisional bandwidth of 3 is again available on line 1-1. The bandwidth of OC-3 for line 1-1 is claimed back by node 101A because SNC1 was released.

When the SETUP2 message for SNC2 reaches node 101A from node 101B, there will be no available bandwidth (AB) for SNC2 on line 1-1 because node 101A has reserved a provisional bandwidth of 3 on line 1-1 for SNC1 (i.e., PB=0 on line 1-1), as indicated in state 115A. As a result the SNC2 is released when the RELEASE2 message is transmitted from node 101A to node 101B, and SNC2 is not established between nodes 101A and 101B. In state 120B, the node 101B will claim back (have available) the bandwidth of 3 for the provisional bandwidth on line 2-1 because SNC2 was released, so that a provisional bandwidth of 3 is again available on line 2-1.

The above situation is an example of the glare condition. This situation may repeat a number of times and result in a live-lock situation which is the event described above. The glare condition resulted in both SNC1 and SNC2 to not be established between node 101A and node 101B, even though sufficient bandwidth was available to establish one of the SNC1 or SNC2 between the nodes 101A and 101B.

Figure 2:
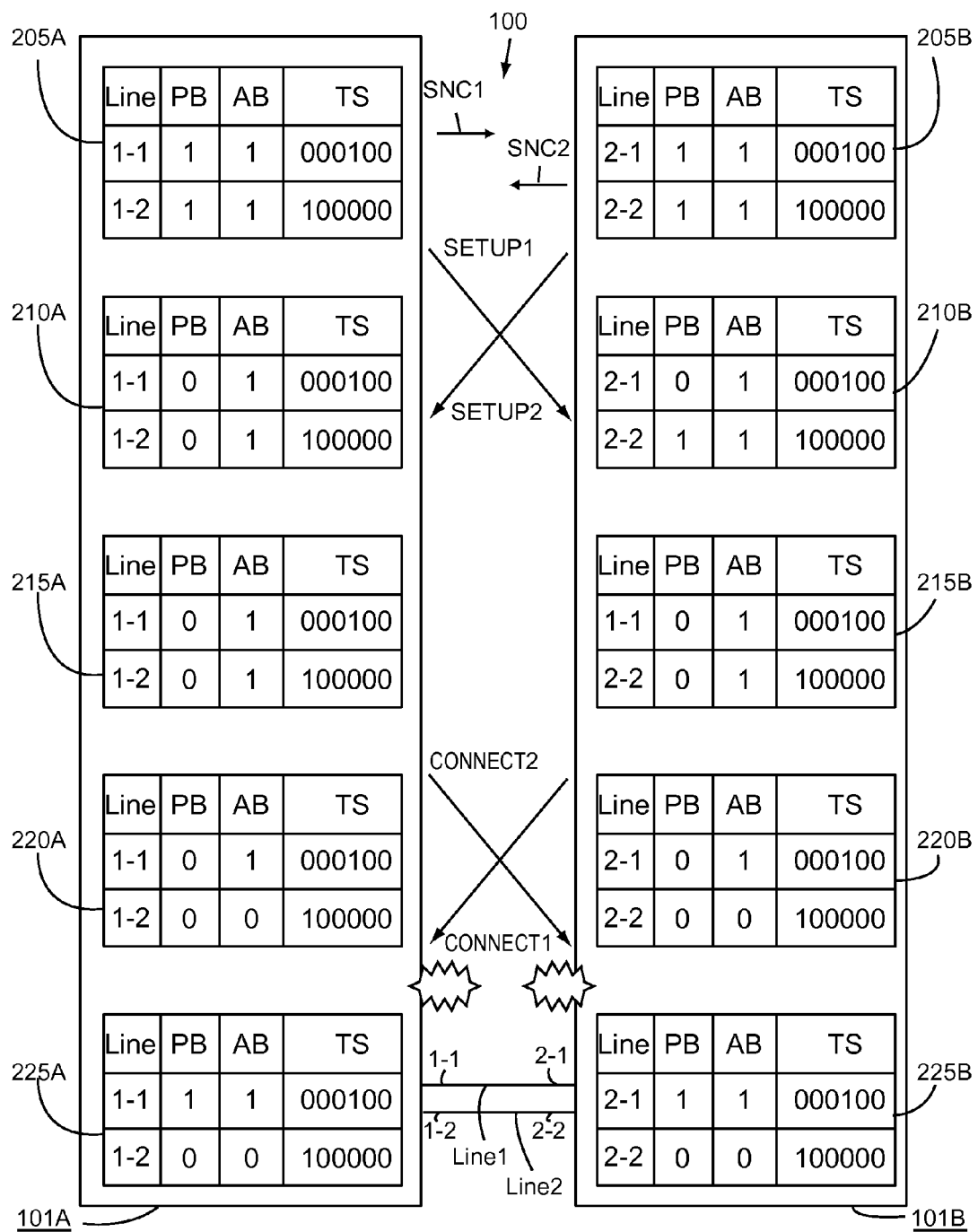
FIG. 2 is a block diagram that illustrates a type of glare condition, known as connect-connect glare, of a conventional method.

FIG. 2 is a block diagram that illustrates a type of glare condition, known as "connect-connect" glare, of a conventional method in the conventional apparatus 100. Assume that the line, Line1, is between nodes 101A and 101B. Line1 is formed by connecting line 1-1 (which originates from node 101A) to line 2-1 (which originates from node 101B). Assume further that a second line, Line2, is between nodes 101A and 101B. Line2 is formed by connecting line 1-2 (which originates from node 101A) to line 2-2 (which originates from node 101B). The lines Line1 and Line2 are aggregated in a single link between the nodes 101A and 101B. Additional details on link aggregation is disclosed in, for example, commonly-assigned U.S. patent application, entitled "LINK AGGREGATION", Ser. No. 10/061,995, now U.S. Pat. No. 7,414,985, which is hereby fully incorporated herein by reference. The state information for the lines 1-1 and 1-2 are stored in a database (not shown in FIG. 2) in node 101A and the state information for lines 2-1 and 2-2 are stored in a database (not shown in FIG. 2) in node 101B.

In the example of FIG. 2, Line1 will have only one available timeslot (TS) of 000100, and Line2 will have only one available timeslot (TS) of 100000. Also, SNC1 (from node 101A) and SNC2 (from node 101B) are being established in this example during the SNC setup phase.

As shown in initial state 205A, line 1-1 has initially a provisional bandwidth (PB) of 1 (STS-1) and an available bandwidth (AB) of 1, while line 1-2 has initially a provisional bandwidth of 1 (STS-1) and an available bandwidth of 1. STS-n (synchronous transport signal level-n) is the various sizes in the SONET hierarchy for an SNC, where n is typically equal to 1, 3, 12, 48, 192 or 768. STS-1 is the SONET standard for transmission over OC-1 optical fiber at a line rate of 51.84 Mbps. STS-n is the SONET standard for transmission over OC-1 optical fiber at a line rate of n×STS-1=n× (51.84 Mbps), where n is typically equal to 1, 3, 12, 48, 192, or 768.

As shown in initial state 205B, line 2-1 has initially a provisional bandwidth of 1 (STS-1) and an available bandwidth of 1, while line 2-2 has initially a provisional bandwidth of 1 (STS-1) and an available bandwidth of 1.

During the SNC setup phase with bandwidth pre-allocation (where bandwidth pre-allocation involves a provisional bandwidth being reserved on a particular line for a particular SNC), assume that an SNC setup message (SETUP1) for SNC1 reaches node 101A at the same time as an SNC setup message (SETUP2) for SNC2 reaches node 101B. Note that the setup messages are then forwarded to the opposite nodes, as shown in FIG. 2 and as similarly mentioned above. A provisional bandwidth (PB) of 1 (STS-1) on line 1-1 will be reserved for SNC1 on node 101A, so that the provisional bandwidth for line 1-1 is now 0 (PB=0) as shown in state 210A. A provisional bandwidth of 1 (STS-1) on line 2-1 will be reserved for SNC2 on node 101B, so that the provisional bandwidth for line 2-1 is now 0 (PB=0) as shown in state 210B.

When the SETUP1 message for SNC1 reaches node 101B, there will be no available bandwidth (AB) for SNC1 on line 2-1 because node 101B has reserved a provisional bandwidth of 1 on line 2-1 for SNC2 (i.e., PB=0 on line 2-1), as indicated in state 210B. Therefore, the second node 101B will reserve a provisional bandwidth of 1 (STS-1) on line 2-2 for SNC1 (i.e., PB=0 on line 2-2), as indicated in state 215B.

When the SETUP2 message for SNC2 reaches node 101A, there will be no available bandwidth (AB) for SNC2 on line 1-1 because node 101A has reserved a provisional bandwidth of 1 on line 1-1 for SNC1 (i.e., PB=0 on line 1-1), as indicated in state 210A. Therefore, the first node 101A will reserve a provisional bandwidth of 1 (STS-1) on line 1-2 for SNC2 (i.e., PB=0 on line 1-2), as indicated in state 215A.

During the SNC connect phase in the OSRP protocol, the actual bandwidth (AB) is allocated for each SNC. The SNC connect phase in the OSRP protocol are known to those skilled in the art. As shown in state 220A, the node 101A will allocate a bandwidth of 1 of the available bandwidth (AB) on line 1-2 for SNC2. Due to this bandwidth allocation on line 1-2 for SNC2, the available bandwidth for line 1-2 will have a value of AB=0 as shown in state 220A. On node 101A, the only available timeslot on line 1-2 (TS=100000 in this example) is allocated for SNC2 as shown in state 220A.

As shown in state 220B, the node 101B will allocate a bandwidth of 1 of the available bandwidth (AB) on line 2-2 for SNC1. Due to this bandwidth allocation on line 2-2 for SNC1, the available bandwidth for line 2-2 will have a value of AB=0 as shown in state 220B. On node 101B, the only available timeslot on line 2-2 (TS=100000) is allocated for SNC1 as shown in state 220B.

Assume that the SNC connect messages, CONNECT1 for SNC1 and CONNECT2 for SNC2, comes back to node 101A and node 101B, respectively, at approximately the same time. The SNC connect messages are known to those skilled in the art. As noted above, line 2-2 (of Line2) has been allocated for SNC1, and line 1-2 (of Line2) has been allocated for SNC2. When the CONNECT2 message for SNC2 returns to node 101B, there is no available bandwidth on line 2-2 (and Line2) because node 101B has previously the line 2-2 for SNC1. Therefore, the allocation for SNC2 has failed, as shown in state 225B. The node 101B will claim back (have available) the bandwidth of 1 for the provisional bandwidth on line 2-1 because SNC2 is released, so that a provisional bandwidth of 1 is again available on line 2-1.

When the CONNECT1 message for SNC1 returns to node 101A, there is no available bandwidth on line 1-2 (of Line2) because node 101A has previously allocated the line 1-2 for SNC2. Therefore, the allocation for SNC1 has failed, as shown in state 225A. The node 101A will claim back (have available) the bandwidth of 1 for the provisional bandwidth on line 1-1 because SNC1 is released, so that a provisional bandwidth of 1 is again available on line 1-1. Therefore, the SNC1 and SNC2 are not establish due to this connect-connect glare condition, and SNC1 and SNC2 are released by node 101A and node 101B, respectively.

Figure 3:
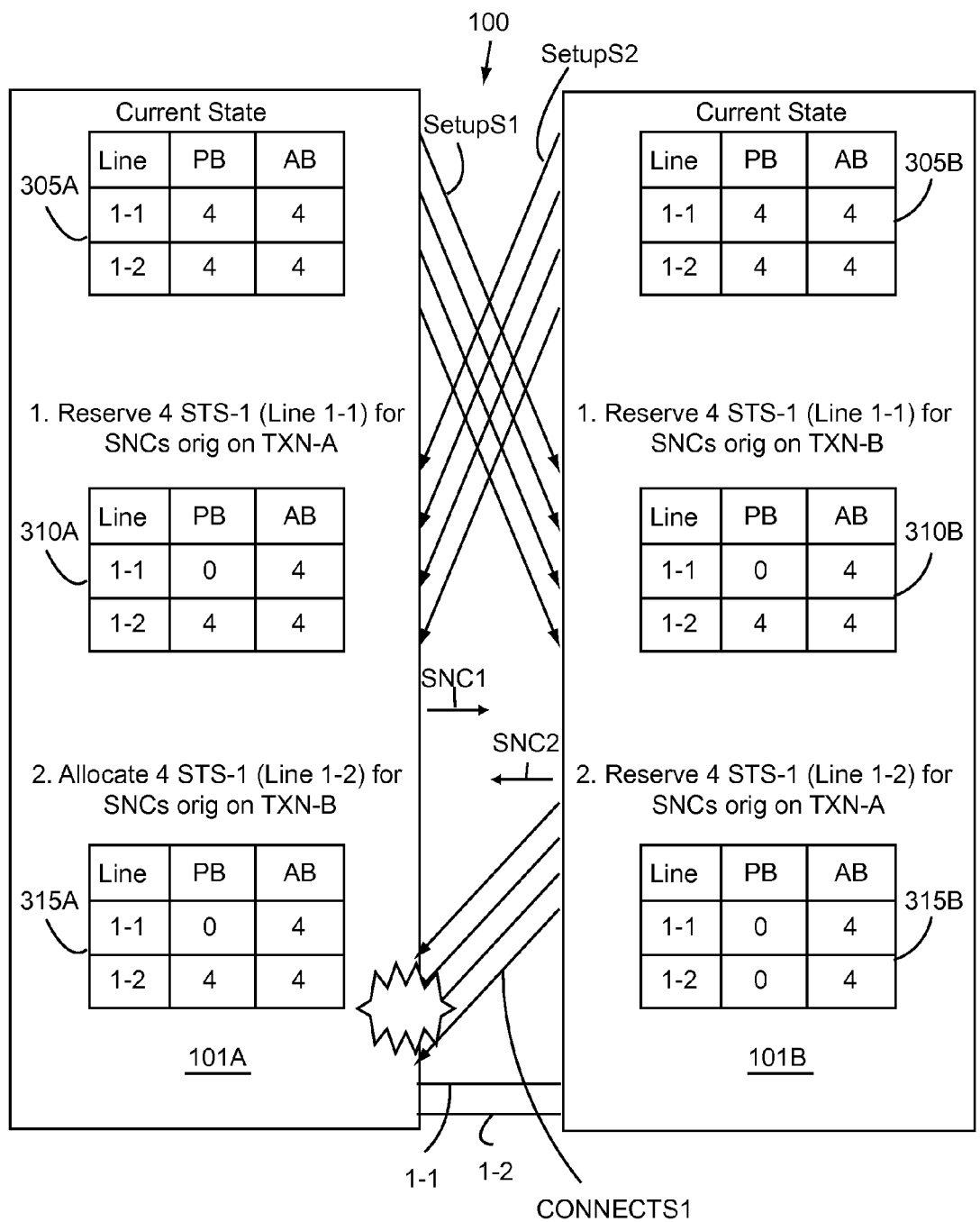
FIG. 3 is a block diagram that illustrates a type of glare condition, known as connect-setup glare, of a conventional method.

FIG. 3 is a block diagram that illustrates a type of glare condition, known as "connect-setup" glare, of a conventional method in the conventional apparatus 100. Assume that there is only one interface (link) with two lines (Line 1-1 and Line 1-2) between node 101A and node 101B, with each line having an available bandwidth (AB) of 4. Assume further, in this example, that there are 4 STS-1 SNCs (referred in FIG. 3 as SNCs1) that are being set up from node 101A to node 101B. At the same time, there are 4 STS-1 SNCs (referred in FIG. 3 as SNCs2) that are being set up from node 101B to node 101A.

As shown in initial state 305A and in initial state 305B, line 1-1 has initially a provisional bandwidth (PB) of 4 (4 STS-1) and an available bandwidth (AB) of 4 (4 STS-1), while line 1-2 has initially a provisional bandwidth of 4 and an available bandwidth of 4.

During the SNC setup phase with bandwidth pre-allocation, assume that SNC setup messages (SETUPs1) for SNCs1 reaches node 101A at the same time as SNC setup messages (SETUPs2) for SNCs2 reaches node 101B. A provisional bandwidth (PB) of 4 (4 STS-1) on line 1-1 will be reserved for SNCs1 on node 101A (see state 310A), and a provisional bandwidth of 4 (4 STS-1) on line 1-1 will be reserved for SNCs2 on node 101B (see state 310B). Therefore, the provisional bandwidth on line 1-1 on node 101A is now 0 (see state 310A), and the provisional bandwidth on line 1-1 on node 101B is now 0 (see state 310B).

When the setup messages (SETUPs1) is sent for SNCs1 (originating on node 101A and sent to node 101B), a provisional bandwidth (PB) of 4 has been allocated on line 1-1 at node 101A as mentioned above. At the same time, the setup signals (SETUPs2) are sent for SNCs2 (originating on node 101B and sent to node 101A), and a provisional bandwidth of 4 has been allocated on line 1-1 at node 101B as mentioned above. When the SETUPs1 for SNCs1 (originating on node 101A) reaches node 101B, there is no provisional bandwidth available on line 1-1 for SNCs1 because node 101B has previously reserved a provisional bandwidth of 4 on line 1-1 for SNCs2 (i.e., PB=0 on line 1-1). Therefore, the second node 101B will allocate a provisional bandwidth of 4 (4 STS-1) on line 1-2 for SNCs1. Therefore, the provisional bandwidth on line 1-2 will now be PB=0, as indicated in state 315B.

Similarly, when the setup signals (SETUPs1) for SNCs2 (originating on node 101B and sent to node 101A) reaches node 101A, there is no provisional bandwidth available on line 1-1 because node 101A has previously reserved a provisional bandwidth of 4 (4 STS-1) on line 1-1 for SNCs1 (i.e., PB=0 on line 1-1). Therefore, the first node 101A will allocate a provisional bandwidth of 4 (4 STS-1) on line 1-2 for SNCs2. Therefore, the provisional bandwidth on line 1-2 will now be PB=0, as indicated in state 315A.

When the CONNECTs1 signals (for SNCs1 originating from node 101A) reaches node 101A from node 101B, the conn_id (identifier in the CONNECTs1 signals) will indicate that SCNs1 has been allocated on line 1-2 by the second node 101B. However, there is no bandwidth available on line 1-2 because the first node 101A has previously allocated a provisional bandwidth of 4 on line 1-2 for SNCs2. Therefore, the allocations of SNCs1 and SNCs2 will fail. Since the SNCs1 and SNCs2 are not established due to this connect-setup glare condition, the SNCs1 and SNCs2 will be released.

Figure 4:
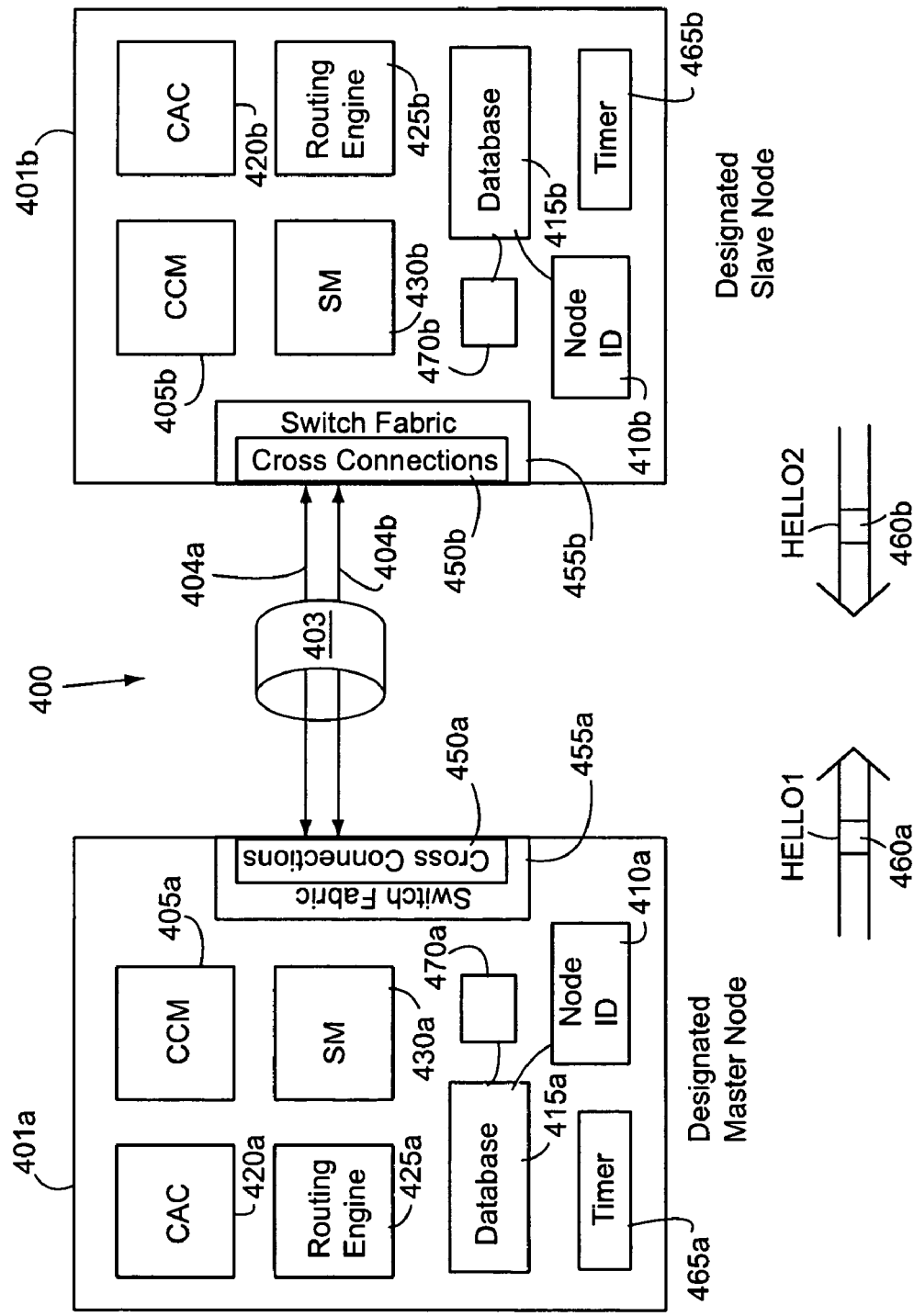
FIG. 4 is a block diagram of an apparatus (system) that can perform glare resolution, in accordance with an embodiment of the invention.

FIG. 4 is a block diagram of an apparatus (system) 400 that can perform glare resolution, in accordance with an embodiment of the invention. The apparatus 400 is typically a portion of a communication network and includes nodes 401a and 401b. Each node (generally referred to as node 401) is a network element and may support various services such as sub-network connections (SNCs). Typically, the nodes 401 use a signaling and routing protocol, such as an optical signaling and routing protocol (OSRP). For example, at least one of the nodes 401 may have the functionality of a switch, such as, for example, a CIENA CoreDirector™ switch which is commercially available from CIENA CORPORATION. Of course, each of the nodes 401 may be other suitable network elements.

As discussed above, glare is a condition where two SNCs (each originating in opposite directions) are contending for the same resource in a network and are not established due to the bandwidth limitation in the link between the nodes. An embodiment of the invention resolves the glare condition (i.e., avoids the glare condition) based upon the following method. During the SNC setup phase, when the SNC setup signals of each SNC are contenting for the same timeslot on the same link (interface) 403 between the nodes 401, then at least one connection will be admitted to set up the SNC, as discussed in detail below. In conventional methods, glare occurs because each node on either side of a link are making a decision, independent from the other node, as to which line and timeslot to use for an SNC. In contrast, an embodiment of the invention avoids the problem of glare by having only one of the nodes 401 on either side of the link 403 to decide which line (generally line 404 and specifically lines 404a and 404b in the FIG. 4 example) and which timeslot to use for an SNC.

In an embodiment of the invention, when a link 403 is established between two nodes 401, the OSRP protocol is used to determine a master-slave relationship between the two nodes on the ends of the link. The master-slave relationship between two nodes 401 connected by the link 403 is determined based upon the node identifier (ID) value (generally node ID value 410) of each node 401. In an embodiment of the invention, by convention, the node 401 with a higher node identifier value 410 is designated as the "master node" and the node 401 opposite to the master node in the link 403 (and having the lower node identifier value 410) is designated as the "slave node". Of course, other alternate convention may be used, such as, for example, designating the node 401 with the lower identifier value 410 as the master node and designating the node 401 with the higher identifier value 410 as the slave node. In the examples discussed below, assume that node 401a is designated as the master node and that node 401b is designated as the slave node. As discussed in the examples below, the designated master node 401a will select a line 404 and a timeslot for the SNC during the SNC setup phase in the OSRP protocol, and the designated slave node 401b will not select a line 404 and a timeslot for the SNC during the SNC setup phase.

Each node 401 includes a CCM module (call control module) 405 which is a module used in the OSRP protocol. In the example of FIG. 4, the CCM module 405 is shown as CCM module 405a in node 401a and as CCM module 405b in node 401b. The CCM module 405 examines a setup message from the opposite node 401 and determines which particular timeslot in a line 404 has been selected for an SNC by the master node 401a.

The CCM modules 405 also read and identify the node ID values 410 of a node 401. The node ID value 410 is typically stored in a memory area of the node 401. The memory area can be in, for example, a database (generally, database 415). For example, the node ID value 410a is stored in database 415a in node 401a, while the node ID value 410b is stored in database 415b in node 401b.

In one embodiment of the invention, the node 401 with the higher node ID value 410 is designated by the CCM modules 405 as a master node and the node 401 with the lower ID value 410 is designated by the CCM modules 405 as the slave node. In the example of FIG. 4, assume that node 401a has a node ID value 410a equal to 200 and that the node 401b has a node ID value 410b equal to 100. Therefore, the CCM modules 405 in both nodes 401a and 401b will designate the node 401a as the master node and the node 401b as the slave node.

Each node 401 includes a CAC (call admission control) module 420 (module 420a in node 401a and module 420b in node 401b) that selects a timeslot in a line 404 that has been selected for an SNC by the master node 401a. The CAC module 420 also creates the cross connections (generally 450) in the switch fabric (generally 455) in a node 401 for a line 404. As known to those skilled in the art, a switch fabric is the combination of hardware and software that can move data coming into a network node on a port to the next node via the correct output port when switching paths are configured. A switch fabric includes the switching units in a node, the integrated circuits that are in the switching units, and the programming software or firmware that allows switching paths to be controlled. The switch fabric typically includes data buffers and the use of a shared memory. As known to those skilled in the art, cross connections are the switching paths that are established in a switch fabric to enable data flow through a node.

Each node 401 includes a routing engine 425 (routing engine 425a in node 401a and routing engine 425b in node 401b) that can compute a working route for a sub-network connection (SNC).

Each node 401 includes a signaling (SM) module 430 (module 430a in node 401a and module 430b in node 401b) that transmits and receives the SNC setup signals and SNC connect signals propagating in the link 403 between the nodes 401.

As mentioned above, each node 40a includes a database 415 that can be accessed by various elements in a node 401, where the database 415 stores, for example, information about each line 404 in the link, including the current state information of each line in the link.

In an embodiment of the invention, as an optional feature, the nodes 401 first determines if both nodes 401 are capable of establishing a master-slave relationship based upon the node ID values 410. The signaling module (SM) 430 in each node 401 sends a hello message (HELLO1 from node 401a and HELLO2 from node 401b) to the node 401 on the other end of the link 403. The hello message will include a flag field 460 which will indicate if a node 401 is capable of establishing a master-slave relationship with the opposite node 401.

As an example, if node 401a sends a hello message (HELLO1) with flag value 460a of 1 (where 1 indicates that node 401a is capable of establishing a master-slave relationship) and the node 401b replies with a hello message (HELLO2) with a flag value 460b of 1, then a master-slave relationship is established between nodes 401a and 401b across the link 403.

As another example, if the node 401a sends a hello message (HELLO1) with flag value 460a of 1 and the node 401b replies with a hello message (HELLO2) with a flag value 460b of 0 (where 0 indicates that node 401b is not capable of establishing a master-slave relationship), then a master-slave relationship is not established between nodes 401a and 401b across the link 403.

As an additional example, if node 401a sends a hello message (HELLO1) with flag value 460a of 1 and the node 401b does not reply with a hello message (HELLO2) within a time period (e.g., 50 milliseconds), then the node 401a will assume that the node 401b is not capable of establishing a master-slave relationship, and as a result, a master-slave relationship is not established between nodes 401a and 401b across the link. A timer (timer 465a in node 401a and timer 465b in node 401b) may be used to set a time period for detecting a hello message from the opposite node 401.

The node 401a is identified as a master node by, for example, setting a master node flag value 470a in the database 415a. The node 401b is identified as a slave node by, for example, setting a slave node flag value 470b in the database 415a.

The various elements of the nodes 401 are illustrated in FIG. 4. It is understood that each of the nodes 401 also includes known elements or modules that may typically be used to perform switching and/or routing functions and other standard operations in the system 400. Additionally, the number of lines 404 in the link 403 may also vary in number.

Figure 5:
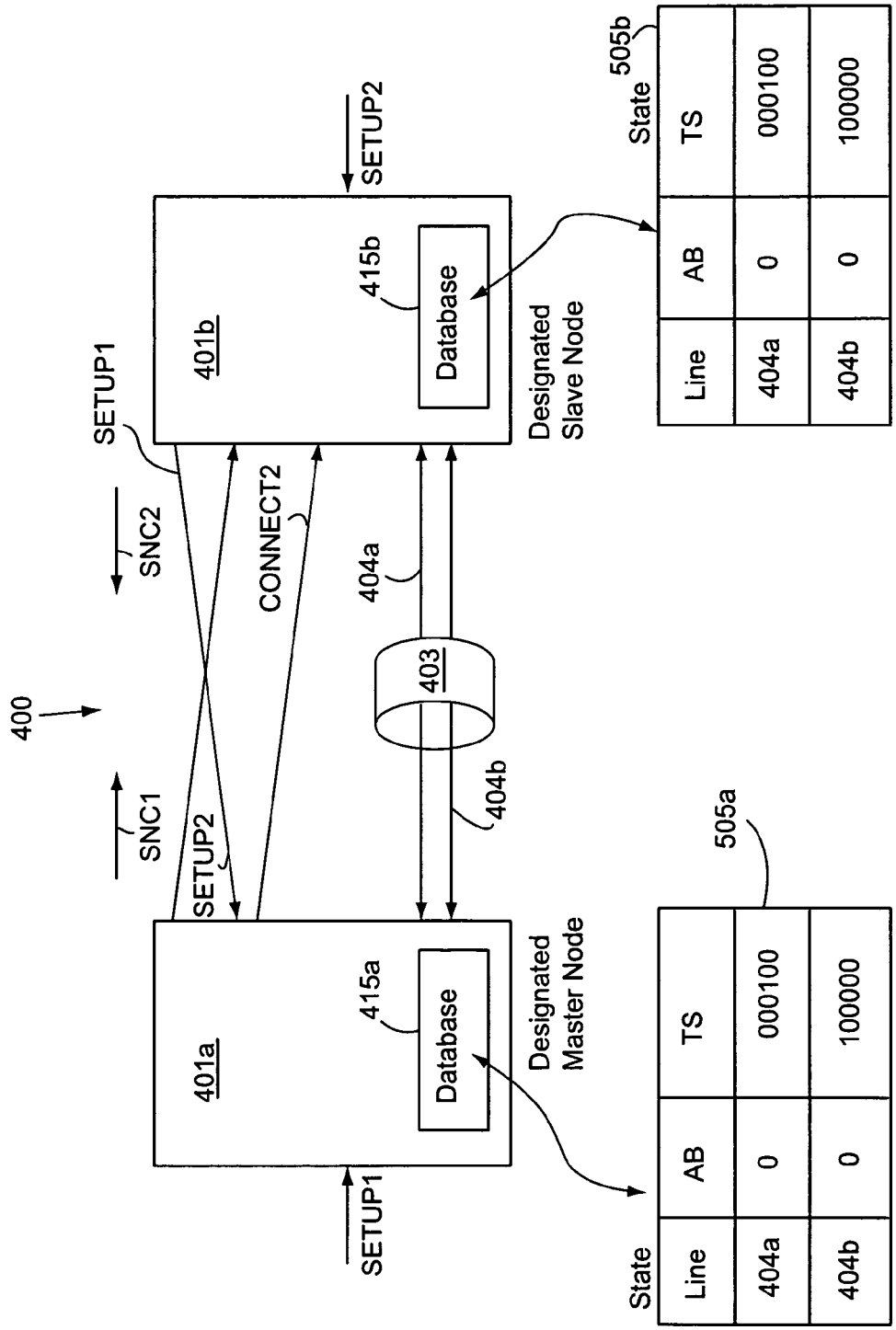
FIG. 5 is a block diagram of an example method for performing glare resolution in the apparatus of FIG. 4, in accordance with an embodiment of the invention.
Figure 6:
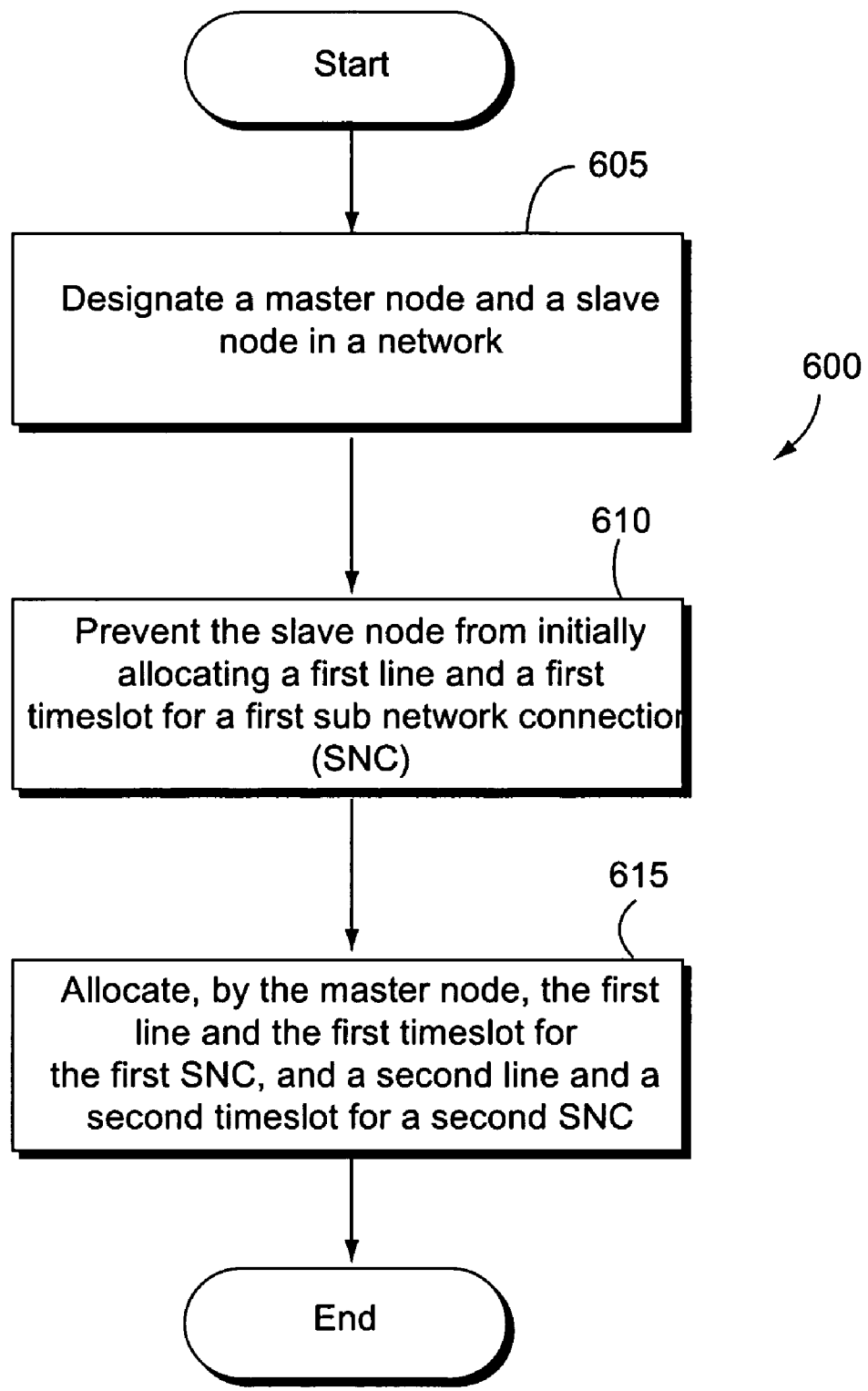
FIG. 6 is a flowchart of a glare resolution method, in accordance with an embodiment of the invention.

Reference is now made to FIG. 4 and FIG. 5 in order to illustrate an example method for performing glare resolution in the apparatus 400, in accordance with an embodiment of the invention. As discussed below, bandwidth allocation for an SNC is performed based upon the available bandwidth for a line 404, and the concept of provisional bandwidth is not used when bandwidth is allocated for an SNC.

As noted above, assume that node 401a is designated as the master node and node 401b is designated as the slave node. Assume further that SNC1 (from node 401a) and SNC2 (from node 401b) are being established. During the SNC setup phase with bandwidth pre-allocation, assume that an SNC setup message (SETUP1) for SNC1 is sent to node 401a and an SNC setup message (SETUP2) for SNC2 is sent to node 101b. In this and the following examples, SNC1 can be multiple SNCs that are setup by multiple SNC setup messages SETUPs1. Similarly, SNC2 can be multiple SNCs that are setup by multiple SNC setup messages SETUPs2. For purposes of focusing on the functionalities of the embodiments of the invention, the example method will only show a single SNC that is set up by a single SNC setup message from one node 401 to the opposite node 401.

In an embodiment of the invention, when the slave node 401b receives the SNC setup message (SETUP2) for SNC2, the slave node signaling module 430b does not forward the SETUP2 message to the slave node CAC module 420b for processing. Therefore, the slave node CAC module 420b is not able to initially allocate (assign) a line 404 and a timeslot (TS) for the SNC2. Instead, the slave node signaling module 430b forwards the SETUP2 message to the master node 401a.

The master node 401a will then allocate a line 404 and a timeslot (TS) for SNC2. Assume, for example, that when the SNC setup message (SETUP1) for SNC1 previously reached node 401a, then master node CAC module 420a had allocated the line 404a and a timeslot (TS) 000100 for SNC1, as shown in state information 505a in the master node database 415a. Therefore, the master node CAC module 420a will allocate another available line and timeslot for SNC2. In this example, the master node CAC module 420a will allocate the line 404b and a timeslot (TS) 100000 for SNC2, after receiving the SETUP2 message for SNC2. In this example, the slave node 401b is an upstream node and master node 401a is a downstream node. An alternative example where the slave node 401b is a downstream node and master node 401a is an upstream node is discussed below.

In the example of FIG. 4, assume that when the SNC setup message (SETUP1) for SNC1 reaches node 401a, then master node CAC module 420a will allocate the line 404a and timeslot (TS) 000100 to SNC1, as shown in state information 505a in the master node database 415a. Therefore, the master node CAC module 420a will allocate another available line and a timeslot for SNC2, after receiving the SETUP2 message for SNC2 from the slave node 401b. In this example, the master node CAC module 420a will allocate the line 404b and timeslot (TS) 100000 for SNC2, after receiving the SETUP2 message for SNC2.

During the SNC connect phase in the OSRP protocol, the master node signaling module 430a then transmits the connect message (CONNECT2) to the slave node 401b. The slave node CCM module 405a will examine the CONNECT2 message to determine the line and timeslot selected for SNC2 by the master node 401a. The slave node CAC module 420b then allocates the line 404b and timeslot (TS) 100000 for SNC2, since the master node 401a had allocated the line 404b and timeslot 100000 for SNC2.

The slave node CAC module 420b then sets the cross connections 450b (see FIG. 4) in the switch fabric 455b, based upon the allocation of the line 404a and timeslot (TS) 000100 for SNC1 and the allocation of the line 404b and timeslot (TS) 100000 for SNC2, as shown in state information 505b.

During the SNC connect phase, the master node CAC module 420a will set the cross connections 450a (see FIG. 4) in the switch fabric 455a, based upon the allocation of the line 404a and timeslot (TS) 000100 for SNC1 and the allocation of the line 404b and timeslot (TS) 100000 for SNC2, as shown in state information 505a.

As another example, assume that the master node 401a is an upstream node and slave node 401b is a downstream node. During the SNC setup phase with bandwidth pre-allocation, when the master node 401a receives the SNC setup message (SETUP1) for SNC1, the master node CAC module 420 will select an available line 404 and a timeslot (TS) for SNC1. Assume, for example, that when the SNC setup message (SETUP1) for SNC1 reaches node 401a, then master node CAC module 420a allocates the line 404a and to timeslot (TS) 000100 for SNC1, as shown in state information 505a in the master node database 415a. The master node signaling module 430a then forwards the SETUP1 message for SNC1 to slave node 401b.

The slave node CCM module 405b examines the SETUP1 message for SNC1 to determine that line 404a and timeslot (TS) 000100 is to be allocated for SNC1. Therefore, slave node CAC module 420b will allocate the line 404a and timeslot (TS) 000100 for SNC1 during the setup phase and will allocate the line 404b and timeslot (TS) 100000 for SNC2 during the SNC setup phase. The line 404b and timeslot (TS) 100000 were available for SNC2 at this point in the setup phase. The master node CAC module 420a will allocate the line 404b and timeslot (TS) 100000 for SNC2, after receiving the SETUP2 message from the slave node 401b during the SNC setup phase.

As in the previous example above, during the connect phase in the OSRP protocol, the slave node 401b will receive the CONNECT2 signal and set the cross connections 450b in the switch fabric 455b, based upon the allocation of the line 404a and timeslot (TS) 000100 for SNC1 and based upon the allocation of the line 404b and timeslot (TS) 100000 for SNC2. The master node 401a will also set the cross connections 450a in the switch fabric 455a, based upon the allocation of the line 404a and timeslot (TS) 000100 for SNC1 and based upon the allocation of the line 404b and timeslot (TS) 100000 for SNC2.

It is noted in the above approach that, for example, if two (2) SNCs (from opposite directions) are competing for only one available timeslot, then glare can still occur due to the contention for the limited resource in the link 403. However, if there is available bandwidth and timeslots for both SNCs, then an embodiment of the invention avoids the glare condition.

FIG. 5 is a flowchart of a glare resolution method 600, in accordance with an embodiment of the invention. A master node and a slave node are designated (605) in a network. The slave node is prevented from initially allocating a first line and a first timeslot (TS) for a first sub network connection (SNC). The master node allocates (615) the first line and the first timeslot for the first SNC, and a second line and a second timeslot for a second SNC.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of this invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

The various engines or modules discussed herein may be, for example, software, commands, data files, programs, code, modules, instructions, hardware, circuits, combinations thereof, or any of the like, and may also include suitable mechanisms.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for glare resolution in a network having at least a purality of nodes, the method comprising:
   computing a path through at least a first node and a second node in the network;
   sending a signal to said first node to establish a sub network connection (SNC) across a link between said first and second nodes;
   after receiving the signal, said first node preventing the first node from allocating a first line and a first timeslot for a first SNC; and
   subsequent to preventing allocating by the first node, the first node establishes a link between the first and second node to determine a master slave relationship respectively between the first and second node;
   subsequent to establishing a link between the first and second node, designating a status of either the first or second node as a slave node;
   subsequent to establishing a link between the first and second node, designating a status of the other of the first or second node as a master node;
   allocating, by the designated master node, the first line and the first timeslot for the first SNC and a second line and a second timeslot for a second SNC.

2. The method of claim 1, wherein designating the master node and the slave node comprises:
   designating the master node status and the slave node status based upon a comparison of a first node identifier value of the first node and a second node identifier value of the second node.

3. The method of claim 1, wherein the master node is designated as the first or second node having a higher respective identifier.

4. The method of claim 1, further comprising:
   forwarding, by the slave node to the master node, a setup message for the first SNC, in order to prevent the slave node from allocating the first line and the first timeslot for the first SNC.

5. The method of claim 4, further comprising:
   allocating, by the master node, the first line and the first timeslot for the first SNC, after receiving the setup message for the first SNC.

6. The method of claim 4, further comprising:
   allocating, by the master node, the second line and the second timeslot for the second SNC, after receiving a setup message for the second SNC.

7. The method of claim 1, further comprising:
   allocating, by the slave node, the second line and the second timeslot for the second SNC after receiving a setup message for the second SNC.

8. The method of claim 1, further comprising:
   allocating, by the slave node, the first line and the first timeslot for the first SNC after receiving a connect message for the first SNC during a connect phase.

9. The method of claim 1, wherein the first SNC is in a direction from the slave node to the master node.

10. The method of claim 1, wherein the second SNC is in a direction from the master node to the slave node.

11. The method for glare resolution of claim 1, further comprising:
    prior to sending a signal to said first node to establish a SNC, determining if the first and second nodes can establish a master-slave relationship.

12. A method for establishing a path across a network having at least a first and second node, the method comprising:

- computing a path through at least a first node and a second node in the network;
- sending a first signal to said first node to establish a first sub network connection (SNC) across a link between said first and second nodes;
- sending a second signal to said second node to establish a second sub network connection (SNC) across a link between said first and second node;
- after receiving the first signal, said first node preventing the first node from allocating a line and a timeslot for a SNC between said first and second node;
- after receiving the second signal, said second node preventing the first node from allocating a line and a timeslot for a SNC between said first and second node;
- subsequent to preventing allocating by the first node, establishing a link between the first and second node to determine a master-slave relationship respectively between the first and second node;
- subsequent to establishing a link between the first and second node, designating a status of either the first or second node as a master node;
- subsequent to establishing a link between the first and second node, designating a status of the other of the first or second node as a slave node;
- allocating, by the designated master node, a first line and the first timeslot for the first SNC and a second line and a second timeslot for a second SNC.

13. The method of claim 12, wherein designating the master node and the slave node comprises:

designating the master node status and the slave node status based upon a comparison of a first node identifier value of the first node and a second node identifier value of the second node.

14. The method of claim 12, wherein the master node is designated as the first or second node having a higher respective identifier.

15. The method for glare resolution of claim 12, further comprising:

prior to sending a first signal to said first node to establish a SNC, determining if the first and second nodes can self-assign a master-slave status based on the results of communications between the first and second nodes.

16. The method of claim 1, further comprising:

forwarding, by the slave node to the master node, a setup message for the first SNC, in order to prevent the slave node from allocating the first line and the first timeslot for the first SNC.

17. The method of claim 4, further comprising:

allocating, by the master node, the first line and the first timeslot for the first SNC, after receiving the setup message for the first SNC.

18. The method of claim 4, further comprising:

allocating, by the master node, the second line and the second timeslot for the second SNC, after receiving a setup message for the second SNC.

19. The method of claim 1, further comprising:

allocating, by the slave node, the second line and the second timeslot for the second SNC after receiving a setup message for the second SNC.

20. The method of claim 1, further comprising:

allocating, by the slave node, the first line and the first timeslot for the first SNC after receiving a connect message for the first SNC during a connect phase.

* * * * *